Jan. 5, 1965   W. T. ACKERMANN   3,164,115
ELECTRON TUBE MOUNTING APPARATUS
Filed April 18, 1961   2 Sheets-Sheet 1
Fig.1.
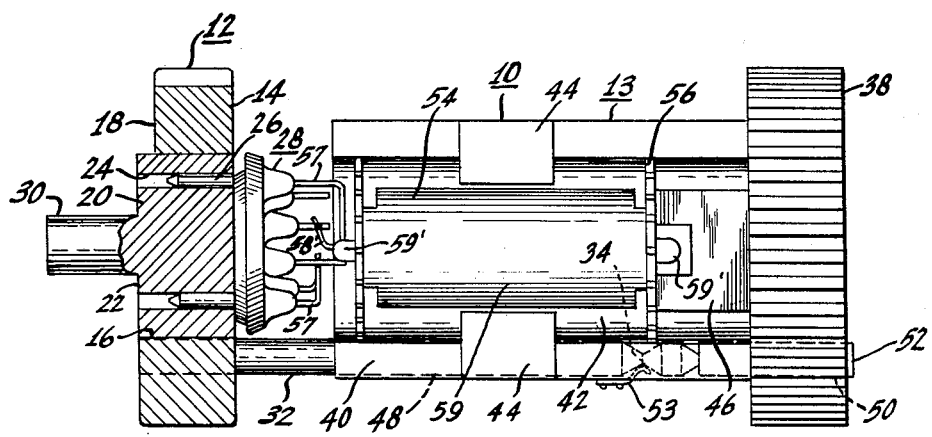
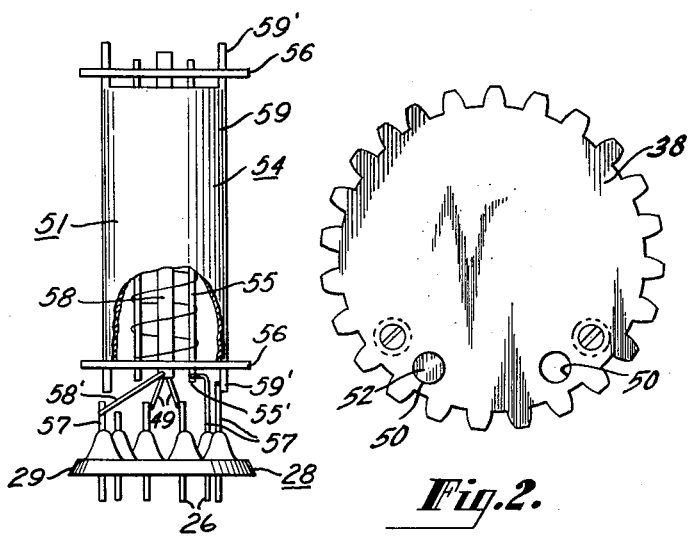
Fig.2.
Fig.4.
INVENTOR.
WALTER T. ACKERMANN
BY
William A. Zalesak
ATTORNEY Jan. 5, 1965 W. T. ACKERMANN 3,164,115
ELECTRON TUBE MOUNTING APPARATUS
Filed April 18, 1961 2 Sheets-Sheet 2

INVENTOR.
WALTER T. ACKERMANN
BY
William A. Zalesak
ATTORNEY

United States Patent Office 3,164,115
Patented Jan. 5, 1965

3,164,115
ELECTRON TUBE MOUNTING APPARATUS
Walter T. Ackermann, Millington, N.J., assignor to Radio Corporation of America, a corporation of Delaware
Filed Apr. 18, 1961, Ser. No. 103,923
12 Claims. (Cl. 113—127)

This invention relates to apparatus for welding a plurality of cut and formed stem lead wires to their appropriate electron tube elements which comprise parts of a previously assembled electron tube cage.

In the process of making electron tubes, the cage and the stem may be made separately. The cage comprises the electron tube elements mounted usually between two parallel spacers, usually of mica. The grid and cathode ends extend through the spacers. Ears on the anodes, which are usually of a magnetic material such as iron, also extend through the spacers. The stem comprises a glass button through which a plurality of conductive leads extend in a vacuum tight manner. The individual lead wires must be conductively connected, usually by welding, to their corresponding electron tube element end or an ear on an anode. In some cases, to facilitate connecting the stem leads to the tube elements, a tab is welded in a previous operation to tube elements or ears. These ends or ears or tabs are hereinafter called terminals. To facilitate welding of lead wires to their respective tube elements, after the stem is completed, the leads therethrough will be cut and formed so that upon assembling the stem and the cage in proper relative position, a lead touches its proper terminal. After the cage and stems are so assembled, the lead wire and its corresponding terminal are welded together. This may be done by hand, or by automatic or semiautomatic machines developed for this purpose. Hand welding is slow and expensive while automatic machines of the prior art are generally not flexible and very costly. That is, an automatic machine that is set up to make welds in a tube of one type, cannot make welds in a tube of another type without expensive and time-consuming rebuilding thereof or substitution of parts therein.

It is therefore an object of this invention to provide a simple inexpensive automatic machine for welding a plurality of formed stem leads to their respective electron tube terminals.

It is an object to provide a simple inexpensive automatic machine for welding stem leads to their respective electrode terminals that is easily and quickly adjustable to make welds in many tube types and with a minimum of substitution of parts.

The invention comprises a means for so holding a stem and a cage with respect to each other that the cut and formed leads extending from the stem contact their respective electrode terminals. The holding means comprising a gear wheel, and the gear is rolled along a rack until the holder is stopped. In the stopped position, a contacting portion of a lead and a terminal is accessible to welding electrodes. Means is provided for moving the welding electrodes to the point where they encompass the contacting portions, and the welder is actuated to make a weld at the contacting portions. The welder may then be withdrawn, the stop withdrawn, and the holding means may roll along the rack until it is stopped by the next stop at which position a similar action takes place. In the meantime, another holder may be fed to the rack and rolls along it until it is stopped by the first stop. A plurality of stops and welders are provided along the length of the rack and a weld is made by the welder at each stop. When the machine of this invention is used in making welds for a different tube type, the only change that need be made is to modify the holding means to hold the different cage and stem of the different tube type, and to reposition the stops and the welders.

A further feature of the invention resides in the holder which is arranged to hold a tube sub-assembly with its terminals in contact with the corresponding cut and formed leads from a tube press or stem.

This invention is described in detail hereinbelow in connection with the accompanying drawing in which:

FIG. 1 is a top or plan view, partly in section, of the stem and cage holder in assembled position and holding a properly oriented stem and cage;

FIG. 2 is an end view of cage holder;

FIG. 4 is a side elevation, partly broken away, of a complete tube sub-assembly comprising a stem and a cage of the type shown in position in FIG. 1.

Figure 3:
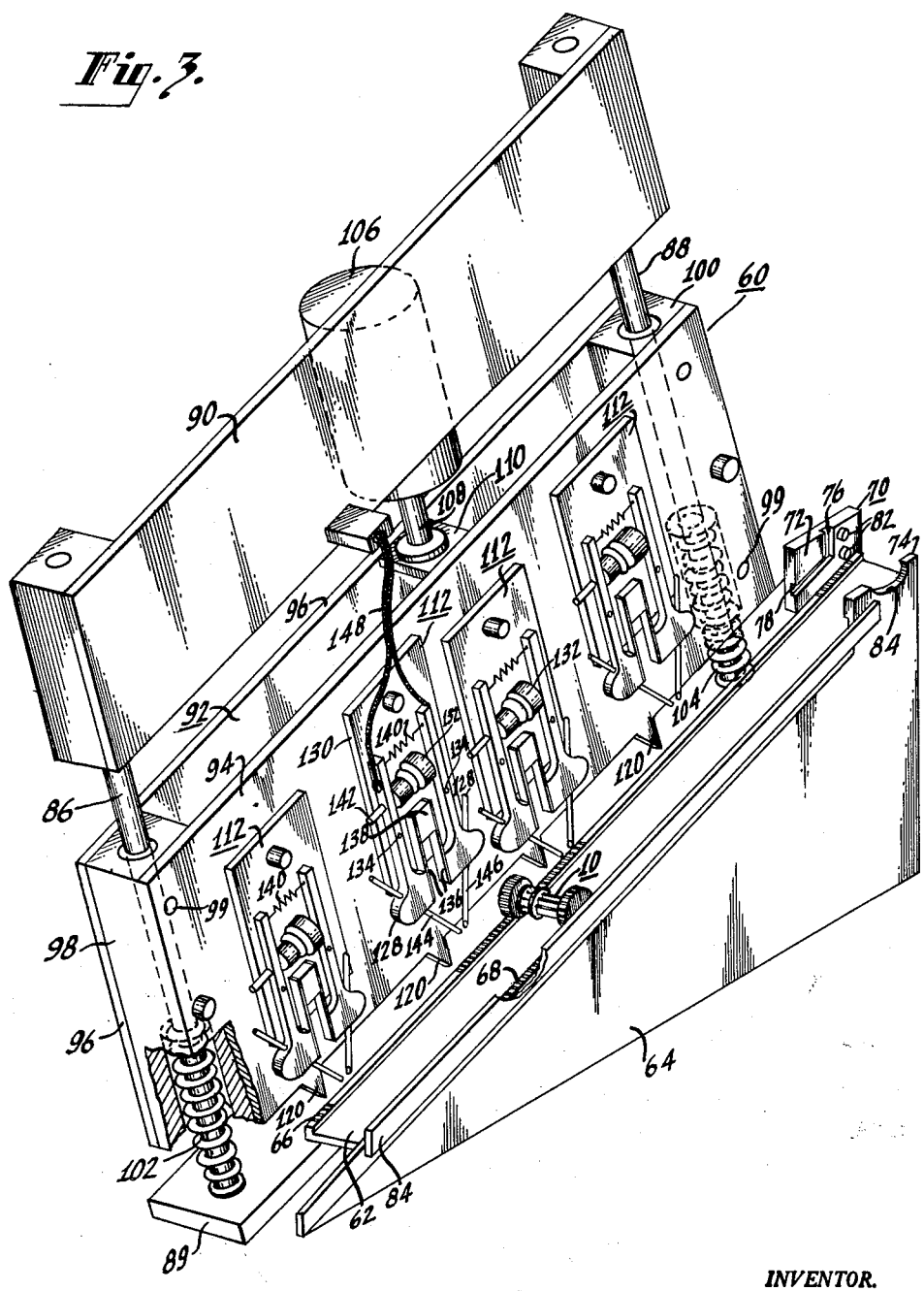
FIG. 3 is a perspective view of the welder of this invention.

A sub-assembly 51 comprising a stem 28 secured to a cage 54 is shown in FIG. 4. Cage 54 comprises a pair of insulating spacer plates 56 between which is mounted a plurality of electrodes including a grid 55, a cathode 58, and a metallic anode 59. End portions of the anode, grid, and cathode electrodes extend through and beyond the spacer plates. Stem 28 comprises a glass header 29 through which are sealed a plurality of leads 26. Different one of the leads are cut and formed, as shown at 57, and are secured as by welding to different end portions of the electrodes. One lead 57 is welded to an extending end portion or tab 59' of anode 59. A tab 58' is provided for connecting the end portion of the cathode 58 to another one of the leads 57. Another lead 57 is welded to an extending portion of the side rod 55' of grid 55.

After the cage 54 is secured to the stem 28, a heater is inserted into the cathode 58 and extending legs 49 of the heater are welded to two of the leads, as shown.

A cage and stem holder assembly 10 is shown in FIG. 1. This assembly 10 comprises a stem holder 12 and a cage holder 13. The stem holder 12 comprises a stem gear 14 having a large central axially directed bore 16 therethrough. A segment of the face of the stem gear 14 is cut away at 18 from its outward face to a small depth for orienting purposes as will be described below. A stem block 20 comprising a circular cylinder 22 is fitted into the bore 16 in the stem gear 14. The stem block 20 has a plurality of axial directed holes 24 arranged in a circular array for receiving the leads 26 of a stem 28 on the face of the stem block 20 directed inward when assembled in place. An indexing space (not shown) is provided between two holes in the block 20 in a known manner, whereby a stem must be properly rotatably oriented with respect to the axis of the stem block 20 before its leads 26 may be inserted therein. The stem block 20 further comprises as an integral part thereof a coaxial cylindrical stop 30 of a diameter smaller than the diameter of the circular array of pin receiving holes 24. The block 20 is so fitted into the gear 14 that the stop 30 faces outward from the gear 14 away from the stem receiving face of the block 20. A pair of rods 32 (only one of which is shown) are eccentrically mounted in an axial direction on the stem gear 14 to extend inward in the opposite direction from stop 30. Rods 32 each has a cut away portion 34 near the end thereof remote from the stem gear 14 for a purpose to be described.

The cage holder 13 comprises a part of the stem and cage holder assembly 10. This cage holder 13 includes cage gear 38 having teeth and a diameter similar to those of stem gear 14. A cage cradle 40, comprising a block of non-magnetic material having a semi-cylindrical channel 42 therein, is fixed to one face of the cage gear 38, the block being so positioned that the axis of the channel 42 is coextensive with the axis of the gear 38. A pair of magnets 44 are laterally mounted on the cage cradle 40 in alignment with each other. An end wafer locator 46 is fixed to the cage gear 38 and is located in the end of the channel 42. The cradle 40 has axially directed holes 48 for receiving the rods 32 of the stem holder 12. As shown in FIG. 2, the holes 48 extend through cage gear 38 at 50. A stop 52 is inserted in one hole 50. Detents 53 cooperating with the cut away portions 34 of the rod 32 are provided in both holes in the cage cradle 40.

In assembling the cage and stem holder 10, the leads 26 of a stem 28 are inserted into the holes 24 provided therefor. A cage 54 is dropped into the cradle 40 with the anode 59 between the magnets 44 and with one spacer 56 in contact with the spacer locator 46. The rods 32 are inserted into the holes 48 in cradle 40 untin a pin 32 hits the stop 52. At this point, the detents 53 cooperating with the cut away portion 34 of the rods 32 hold the stem holder 12 and the cage holder 13 firmly but detachably together. Since a cradle 40 is chosen having a channel 42 that fits the end wafer 56 and since the magnets 44 attract the magnetic portions, usually the anode 59 of the cage 54, the cage is firmly held in the cage holder 13. The cage is rotatably oriented with respect to the axis of the cage holder 13 and aligned with the stem by contact of the wafer 56 with the wafer locator 46 into which tube element ends and ears fit. Therefore, upon assembly of the stem holder 12 to the cage holder 13 a cage and stem holder 10 is produced in which respective portions of the formed stem leads 57 contact corresponding electrode end portions. The stem and cage holder 10 is then inserted into the welder 60.

The welder assembly 60 is shown in FIG. 3. The welder assembly 60 comprises a track 62 mounted on a support 64 in an inclined manner. The track 62 comprises two similar racks 66 and 68 arranged parallelly to each other. Orienting means 70 for the holder 10 is mounted at the top of the track 62. The orienting means 70 comprises an inner grooved member 72 and an outer member 74. The groove in the inner groove member 72 is L-shaped having a vertical branch 76 and a branch 78 the latter of which is parallel to the track 62. Orienting pins 82 project from the grooved member 72 in an array parallel to the vertical groove 76. The inner grooved member 72 is mounted along the inner edge of the track 62 with the grooved side of the member and the pins 82 inwardly facing the outer orienting member 74. The outer orienting member 74 is mounted on the other side of the track 62 and faces the inner orienting member 72. The upper end 84 of the outer member 74 is cut away in a curve to fit the cage gear 38; however, no teeth are provided in this cut away portion. A cage and stem holder 10 is placed over the track 62 at the upper end thereof with the cylindrical stop 30 projecting into the vertical branch 76 of the groove in the grooved member 72 and with the cage gear 38 resting in the cut away portion 84. The holder 10 is then rotated and pushed towards the inner member 72 manually until the pins 82 enter into the cut away portion 18 of the stem gear. At thta time the cage and stem holder 10 will be moved laterally to the point where the cage gear 38 will clear the outer member 74 and the holder 10 will be deposited on the track 62 in an oriented position. The pins 82, due to the fact that they project inwards and due to the fact that they are to one side of the groove 76, cooperate with the cut away portion 18 of the stem gear to prevent the cage and stem assembly 10 from being placed in the track 62 in any manner except in an oriented manner. The lower portion 78 of the groove, through which the cylindrical stop 30 passes, insures meshing of the teeth of the gears and of the racks.

The welder assembly further comprises individual welders mounted on a frame. The frame 92 comprises a front plate 94 and a back plate 96 and a pair of bearing blocks 98 and 100 therebetween, all fixed together as by screws 99. The frame 92 is slidably mounted on support rods 86 and 88 which extend through bearing blocks 98 and 100. The support rods 86 and 88 are fixed in position between lower and upper support plates 89 and 90 in a slanting manner and perpendicular to track 62. A plurality of compression springs 102 and 104 mounted on rods 86 and 88 between plate 89 and frame 92 urge the frame 92 to its upper position. An air cylinder 106 is fixed to upper plate 90, the piston rod 108 thereof extending downwardly. The piston rod 108 is fixed to the frame 92 as by bracket 110. In this manner, the frame 92 and everything mounted thereon may be moved downwardly against the force applied by springs 102 and 104. Stops (not shown) may be provided as desired to limit motion of the frame in either direction.

A plurality of spot welders 112 (four being shown) are mounted in side by side position on plate 94 and overlying track 62. The spot welders 112 are fixed at different heights on plate 94 and at predetermined positions therealong as will be more fully explained below. A plurality of stops 120, which may comprise integral portions of the lower edge of plate 94 are provided, one for each welder 112. The stops 120 are made relatively long in a direction towards the track 62 for a purpose to be described.

The welders 112 mentioned above are conventional and are described only generally. The welders comprise electrode holders 128 pivotally mounted at 134 on plates 130. An air cylinder and piston assembly 132 is mounted between the electrode holders 128 in such manner as to rotate them about their pivots 134. The leaf spring means 136 fixed to opposite sides of an insulating spacer 138, which is itself fixed to plate 130, serves the purpose of insulatingly supporting and positioning the electrode holders 128 and for urging them apart. Tension spring 140 stretched between the upper ends of electrode holders 128 act to push the piston of the assembly 132 into its cylinder when air pressure is released from the cylinder. Compressed air is led to the cylinder through fitting 142. Various welder instruments and controls are provided but not shown here since they are conventional. Welder electrodes 144 and 146 extend through the electrode holders 128. Welding current is supplied to the electrodes through the electrode holders 128 by means of leads 148. The opertion of the welders 112 is described generally in connection with the description of the operation of the welder assembly of this invention.

The welding operation of this apparatus is as follows: At the beginning of the cycle, air is admitted to cylinder 106, moving the piston rod 108 and plate 94 down. A stem and cage holder 10 is loaded with a stem and a cage and is placed on the track 62 in an oriented manner as described above. The holder rolls down the track 62 until the cylindrical stop 30 on the holder 10 hits the first stop 120 on the plate 94. The holder 10 is then so oriented that a contacting portion of a stem lead 57 and a tube electrode end portion is accessible to the electrodes 144, 146 of the welder 112. The piston rod 108 continues to move the plate down carrying the welders 112 with it, the stops 120 being deep enough in vertical direction to permit such motion, until the welder electrodes 144 and 146 encompass the contacting portions of a formed lead 57 and its adjacent tube electrode end portion. At this time the frame has reached its lowest position and it remains there until a weld or welds are completed. In the meantime, compressed air is admitted to the piston and cylinder assembly 132 and the electrodes 144 and 146 press the elements to be welded together. Welding current is applied to the electrodes through the leads 148. When the weld is completed, compressed air is released from the piston and cylinder assembly 132 and spring 140 moves the electrodes 144 and 146 apart. Then compressed air is released from cylinder 106 and frame 92 is raised by springs 102 and 104. At first the welder electrodes 144 and 146 are moved above the cage and stem holder 10. Upon further raising of the plate 94, the stop 120 of the plate 94 disengages stop 30 on the cage and stem holder 10. The holder 10 then starts rolling down the track 62. FIG. 3 shows the holder 10 rolling between stops 120. Compressed air is applied to cylinder 106. The plate 94 moves downward again. In the meantime, an operator has put a stem and cage holder into the track 62 in properly oriented position. As the plate 94 is moved down, the stops 120 forming a part of the plate 94 stop the stem and cage holders 10 at positions along the track 62. As the plate 94 continues to go down, the welding operation takes place at each welding position where there is a cage and stem holder. This action is continued, as many welds being performed at each time as there are welders.

It will be noted that setting up the machine of this invention to produce welds in different tube types is readily accomplished merely by substitution of a stem holder 12 or cage holder 13 or both in the stem or cage holding assembly 10 to fit the different tube type. Also, a plate 94 is removed from frame 92 and another plate 94 having welders 112 and stops 120 thereon in the appropriate positions for the different tube type is fixed to the frame 92. Or, if desired, adjustably positioned stops 120 may be provided and the position of the welders may be adjusted on a plate 94. Therefore, this apparatus is adapted to be set up to make welds on short runs of tubes easily, expeditiously and economically.

What is claimed is:

1. In combination, a geared work holder and a welding apparatus comprising a gear track along which said geared work holder may move mounted along a plane, a plate mounted for motion in a plane perpendicular to the first mentioned plane, a welder mounted on said plate, said plate being so positioned that said welder overlies said track, a stop fixed to said plate, and means for moving said plate to a position where said stop is near to said track for stopping motion of said work holder along said track.

2. In combination, a geared piece work holder and a welder comprising a gear track along which said geared work piece holder may roll, an orientor for orienting said work piece holder mounted adjacent an end of said track, stop means mounted at points along said track for stopping the rolling of said work piece holder along said track, welding means operably associated with said stop means mounted at points along said track for making welds in a work piece mounted on said work piece holder, means for moving said stop means and said welder means with respect to said track to a welding position and to a non-welding position with respect thereto.

3. In combination, a work holder including a pair of oppositely disposed gears and a welding apparatus comprising a pair of inclined gear tracks adapted to be engaged by said gears whereby said work holder is adapted to roll down said tracks, a plate having a stop fixed thereon, a spot welder mounted on said plate, said plate being positioned along one side of said pair of tracks and in such manner that said welder overlies said pair of tracks, and means for moving said plate into and away from said position such that said stop is closely adjacent to said pair of tracks for stopping the motion of said work holder along said pair of tracks and adjacent said welder.

4. In combination, a plurality of geared work holders and a welding apparatus comprising an inclined gear track along which said work holders may move, a plate having a stop mounted for motion along one side of said track, a welder mounted on said plate, said plate being so positioned that said welder overlies said track, said stop fixed to said plate and means for moving said plate in a position where said stop is near enough to said track so as to stop motion of said work holders along said track.

5. In combination, a plurality of work piece holders and a welding apparatus comprising an inclined gear track along which said work piece holders may move, means for orienting a work piece holder at the top of said track, a plate mounted for motion along side of said track, a welder mounted on said plate, said plate being so positioned that said welder overlies said track, a stop fixed to said plate and means for moving said plate to a position where said stop is near enough to said track so as to stop motion of said work piece holders along said track.

6. In combination, a cage and stem holder and a welding apparatus comprising an inclined gear track, means for orienting said cage and stem holder at the top of said track, said orienting means comprising a plate having a vertically arranged groove therein adjacent said track, a plate mounted for motion in a plane along side of said track, a welder mounted on said plate to overlie said track, a stop fixed to said plate, and means for moving said plate to a position where said stop is near enough to said track so as to stop motion of said cage and stem holder along said track.

7. The invention of claim 6 in which a plurality of welders are mounted on said plate and a like plurality of stops extend from an edge of said plate.

8. A stem and cage holder comprising a stem gear, a stem holder mounted on said stem gear, a cage gear, a cage holding means mounted on said cage gear, rods extending from one of said stem gear and said cage holding means, the other of said stem gear and said cage holding means having axially directed holes slidably receiving said rods, said holes having means therein for locking said rods within said holes, whereby a stem held in said stem holder and a cage held in said cage holder will be positioned in predetermined oriented position upon inserting said rods into said holes.

9. A stem and cage holder comprising a gear, means for holding a stem on said gear in preselected rotational orientation with respect to the axis of said gear, a cylindrical stop extending from said gear and concentric with the axis thereof, a similar gear, means for holding a cage on one side of said similar gear in alignment and in proper rotational orientation with respect to said stem, and means for attaching said gears with said cage holding means and said stem holding means between said gears and with the axes of said gears in alignment.

10. A stem and cage holder comprising a gear, means for holding a stem on said gear in preselected rotational orientation with respect to the axis of said gear, a similar gear, means for holding a cage on one side of said similar gear in alignment and in proper rotational orientation with respect to said stem and means for attaching said gears with said cage holding means and said stem holding means between said gears and with the axes of said gears aligned.

11. A stem and cage holder comprising a gear, means for holding a stem on said gear in preselected rotational orientation with respect to to the axis of said gear, a cylindrical stop extending axially from said stem holder, a further gear in alignment and in proper rotational orientation with respect to said stem, means for holding a cage on one side of said further gear and means for detachably fastening said gears with said cage holding means and said stem holding means between said gears and with the axes of said gears aligned.

12. The combination of a cage and stem holder and a welder, said stem and cage holder comprising a stem gear and a cage gear, said stem gear having a stem holder fixed thereto and a cylindrical stop extending axially therefrom, said cage gear having a cage holder fixed thereto, and means for detachably fixing said stem gear to said cage gear with said cage holder between said gears and said stop extending away from said gears, said welder comprising an inclined rack for meshing with said gears and orienting means at the top of said rack, said orienting means comprising a plate having a vertical groove therein, said groove being shaped and positioned to fit said cylindrical stop, a vertically movable plate positioned along side said rack, a plurality of welders fixed to said plate and overlying said rack, a like plurality of stops fixed to the bottom of said plate, and means for moving said vertical plate to a position where the stops thereon are close to said track, whereby said cage and stem holder may be so positioned on the orientor that the cylindrical stop fits the vertical groove and whereby upon release of said cage and stem holder, said cage gear and said stem gear roll down the rack until stopped at a welding position by cooperation of a stop on said vertical plate with said cylindrical stop.

References Cited in the file of this patent

UNITED STATES PATENTS

| | | |
|---|---|---|
| 391,171 | McDonald et al. | Oct. 16, 1888 |
| 471,360 | Quentell | Mar. 22, 1892 |
| 675,507 | Case | June 4, 1901 |
| 708,798 | Coll | Sept. 9, 1902 |
| 1,743,755 | Casella et al. | Jan. 14, 1930 |
| 2,167,006 | Schmidt | July 25, 1939 |

FOREIGN PATENTS

| | | |
|---|---|---|
| 712,152 | France | June 14, 1932 |